(12) United States Patent
Moriwaki (10) Patent No.: US 8,922,744 B2
(45) Date of Patent: Dec. 30, 2014

(54) LIQUID CRYSTAL DISPLAY DEVICE

(75) Inventor: Hiroyuki Moriwaki, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 362 days.

(21) Appl. No.: 13/515,075

(22) PCT Filed: Nov. 10, 2010

(86) PCT No.: PCT/JP2010/006608
§ 371 (c)(1),
(2), (4) Date: Jun. 11, 2012

(87) PCT Pub. No.: WO2011/086623
PCT Pub. Date: Jul. 21, 2011

(65) Prior Publication Data
US 2012/0257152 A1  Oct. 11, 2012

(30) Foreign Application Priority Data
Jan. 14, 2010 (JP) .................................. 2010-005819

(51) Int. Cl.
*G02F 1/1339* (2006.01)
*G02F 1/1337* (2006.01)
*G02F 1/1362* (2006.01)

(52) U.S. Cl.
CPC ............ *G02F 1/1339* (2013.01); *G02F 1/1337* (2013.01); *G02F 1/133788* (2013.01); *G02F 1/136227* (2013.01); *G02F 2001/13398* (2013.01); *G02F 2001/133776* (2013.01)
USPC ............ 349/153; 349/155; 349/156; 349/190

(58) Field of Classification Search
USPC .................................................. 349/149–153
See application file for complete search history.

(56) References Cited

U.S. PATENT DOCUMENTS

| | | | | |
|---|---|---|---|---|
| 6,392,735 | B1* | 5/2002 | Tani | 349/156 |
| 7,088,417 | B2* | 8/2006 | Kamijima et al. | 349/152 |
| 7,433,011 | B2* | 10/2008 | Liao | 349/153 |
| 2004/0246420 | A1 | 12/2004 | Morimoto et al. | |
| 2006/0136556 | A1* | 6/2006 | Stevens et al. | 709/203 |
| 2006/0232740 | A1 | 10/2006 | Shigemura et al. | |
| 2007/0279565 | A1 | 12/2007 | Iwato et al. | |
| 2008/0018848 | A1 | 1/2008 | Iwato et al. | |
| 2008/0062360 | A1 | 3/2008 | Kobayashi et al. | |
| 2008/0123035 | A1 | 5/2008 | Wu et al. | |
| 2009/0279039 | A1 | 11/2009 | Kotani et al. | |

FOREIGN PATENT DOCUMENTS

| | | |
|---|---|---|
| JP | 2004-361623 A | 12/2004 |
| JP | 2006-301115 A | 11/2006 |
| JP | 2007-322627 A | 12/2007 |
| JP | 2008-26345 A | 2/2008 |
| WO | 2007/129489 A1 | 11/2007 |

OTHER PUBLICATIONS

Official Communication issued in International Patent Application No. PCT/JP2010/006608, mailed on Dec. 28, 2010.

* cited by examiner

*Primary Examiner* — Hoan C Nguyen
(74) *Attorney, Agent, or Firm* — Keating & Bennett, LLP (57) ABSTRACT

In the disclosed liquid crystal display device, electrode portions are formed in sealing member regions on a first substrate and a second substrate, respectively, so that the electrode portions are electrically connected to each other through a conductive material in a sealing member. A control structure for controlling a flow of an alignment film material before curing is provided at least between the electrode portion and a pixel region on at least one of the first substrate or the second substrate so that at least part of the electrode portion is exposed from an alignment film.

16 Claims, 6 Drawing Sheets

LIQUID CRYSTAL DISPLAY DEVICE

TECHNICAL FIELD

The present invention relates to liquid crystal display devices, particularly to control of application of an alignment film.

BACKGROUND ART

In general, a liquid crystal display device includes a liquid crystal layer sealed between a pair of substrates. One of the paired substrates is a TFT substrate including a plurality of gate lines, a plurality of source lines, a plurality of pixel electrodes, a plurality of TFTs, etc. The other substrate is a counter substrate including a common electrode corresponding to the plurality of pixel electrodes. The liquid crystal layer is sealed with a frame-shaped sealing member surrounding the liquid crystal layer between the TFT substrate and the counter substrate.

Each of the TFT substrate and the counter substrate includes an alignment film formed on a surface facing the liquid crystal layer to control orientation of liquid crystal molecules in the liquid crystal layer. The alignment film is made of a resin film, such as a polyimide film, and rubbing or photo-alignment has been performed on a surface thereof.

The alignment film is formed by applying liquid polyimide on the surfaces of the TFT substrate and the counter substrate, and baking the liquid polyimide to cure. The polyimide may be applied by flexography, ink jet printing, etc.

In forming the alignment film by the ink jet printing, viscosity of an alignment film material such as polyimide needs to be relatively low so that drops of the alignment film material discharged toward the substrate and hit on the substrate can sufficiently spread on the surface of the substrate. However, the low viscosity alignment film material can smoothly spread on the surface of the substrate, and the alignment film material may unnecessarily spread to a region for forming the sealing member.

Patent Documents 1 and 2 propose a technique of preventing the excessive spread of the alignment film material by forming a groove in the TFT substrate between the region for forming the sealing member and a pixel region which contributes to display so that the groove can hold the alignment film material.

CITATION LIST

Patent Documents

[Patent Document 1] Japanese Patent Publication No. 2004-361623
[Patent Document 2] Japanese Patent Publication No. 2007-322627

SUMMARY OF THE INVENTION

Technical Problem

When the groove is formed to hold the alignment film material therein as described in Patent Documents 1 and 2, the groove needs to be relatively wide to ensure a capacity for holding the alignment film material. As a result, a distance between the pixel region and the sealing member region increases, and a frame-shaped non-display region formed around the pixel region cannot easily be narrowed.

According to another known technology, a plurality of electrode portions are formed in the sealing member region, and the electrode portions are conducted to the common electrode on the counter substrate through conductive particles dispersed and mixed in the sealing member.

Figure 9:
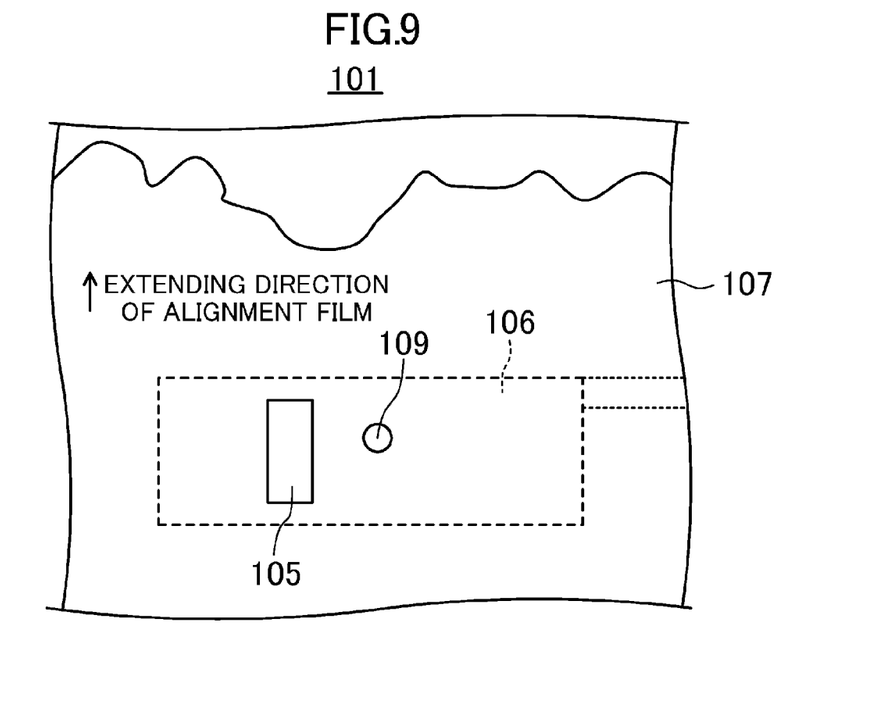
FIG. 9 is an enlarged plan view showing a sealing member region of a liquid crystal display device according to a related technology.

Referring to an enlarged plan view of FIG. 9 and an enlarged cross-sectional view of FIG. 10, the structure of the sealing member region of the liquid crystal display device according to a related technology will be described below in connection with a technical problem to be solved by the present invention.

Figure 10:
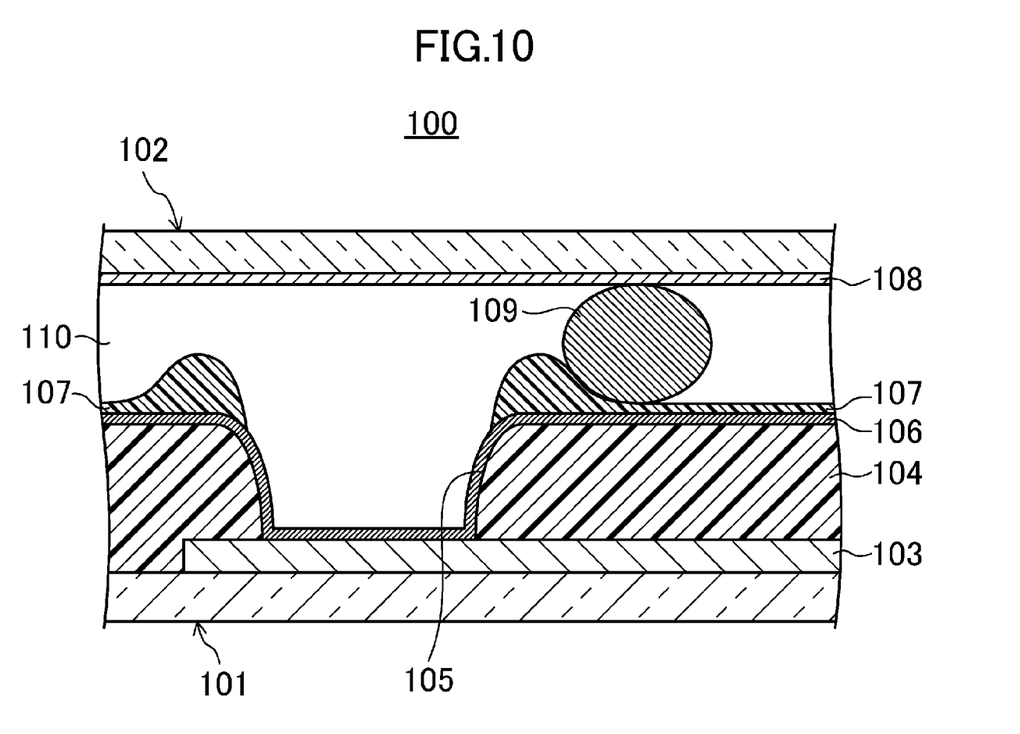
FIG. 10 is an enlarged cross-sectional view showing the sealing member region of the liquid crystal display device according to the related technology.

A liquid crystal display device 100 includes a TFT substrate 101 and a counter substrate 102 facing each other as shown in FIG. 10. A first electrode 103 and an interlayer insulating film 104 covering the first electrode are formed in a sealing member region for forming a sealing member on the TFT substrate 101. An opening 105 is formed in the interlayer insulating film 104 to penetrate the interlayer insulating film 104 to reach part the first electrode 103. The opening 105 is rectangular when viewed in a direction normal to the substrate as shown in FIG. 9.

A second electrode 106 is formed on the TFT substrate 101 to directly cover a surface of the interlayer insulating film 104, an inner wall surface of the opening 105, and the first electrode 103 exposed in the opening 105. Thus, the second electrode 106 is electrically connected to the first electrode 103. The second electrode 106 may be made of a transparent conductive film, such as an indium tin oxide (ITO) film. Unlike the TFT substrates of Patent Documents 1 and 2, the TFT substrate 101 is not provided with the groove.

An alignment film 107 is formed on the interlayer insulating film 104 to cover the second electrode 106. The alignment film 107 is formed by spreading a low viscosity alignment film material from a pixel region (not shown) in an upward direction in FIG. 9 to cover the second electrode 106 and surround the opening 105. A common electrode 108 made of ITO etc. is formed on a surface of the counter substrate 102 facing the TFT substrate 101. Part of the common electrode 108 faces the second electrode 106. A sealing member 110 in which a plurality of conductive particles 109 are dispersed is provided between the counter substrate 102 and the TFT substrate 101. The conductive particles 109 are conducted with the common electrode 108.

However, since the alignment film 107, which is an insulating film, extends to the sealing member region to cover the second electrode 106, the alignment film 107 which is present between the second electrode 106 and the conductive particles 109 may inhibit conduction between the second electrode 106 and the common electrode 108 through the conductive particles 109.

In view of the foregoing, the present invention has been achieved. The present invention is concerned with narrowing a non-display region of a liquid crystal display device as much as possible, while ensuring electrical connection between a pair of substrates.

Solution to the Problem

In view of the above concern, the present invention is directed to a liquid crystal display device including: a first substrate; a second substrate facing the first substrate; a liquid crystal layer provided between the first substrate and the second substrate; and a sealing member provided between the first substrate and the second substrate to surround and seal the liquid crystal layer.

Each of the first substrate and the second substrate includes a pixel region as a display region, a frame region as a non-display region which surrounds the pixel region and includes a sealing member region for forming the sealing member, alignment films, each extending from the pixel region to the sealing member region, are formed on a surface of the first substrate facing the liquid crystal layer and a surface of the second substrate facing the liquid crystal layer, respectively, by curing an alignment film material having fluidity, electrode portions are formed in the sealing member regions of the first substrate and the second substrate, respectively, so that the electrode portions are electrically connected to each other through a conductive material, and a control structure is formed at least between the electrode portion and the pixel region on at least one of the first substrate and the second substrate to control a flow of the alignment film material before curing so that at least part of the electrode portion is exposed from the alignment film.

Effects

Effects of the present invention will be described below.

In fabricating the liquid crystal display device, the alignment film before curing spreads from the pixel region to the sealing member region. The flow of the alignment film material which reached the sealing member region is controlled by the control structure, and at least part of the electrode portion is not covered with the alignment film, and is kept exposed. Thus, the part of the electrode portion and the conductive material are electrically connected because the alignment film is not present therebetween.

Even when a groove for holding the alignment film material is not formed between the pixel region and the sealing member region, the electrode portion on the first substrate and the electrode portion on the second substrate can electrically be connected through the conductive material. Thus, the frame region can greatly be narrowed, and the electrical connection between the first and second substrates can be ensured.

Advantages of the Invention

According to the present invention, the electrode portion on the first substrate and the electrode portion on the second substrate can electrically be connected through the conductive material even when the groove for holding the alignment film material is not provided between the pixel region and the sealing member region. Thus, the frame region can greatly be narrowed, and the electrical connection between the first and second substrates can be ensured.

DESCRIPTION OF EMBODIMENTS

Embodiments of the present invention will be described in detail below. The present invention is not limited to the following embodiments.

[First Embodiment of the Invention]

FIGS. 1-4 show a first embodiment of the present invention.

Figure 1:
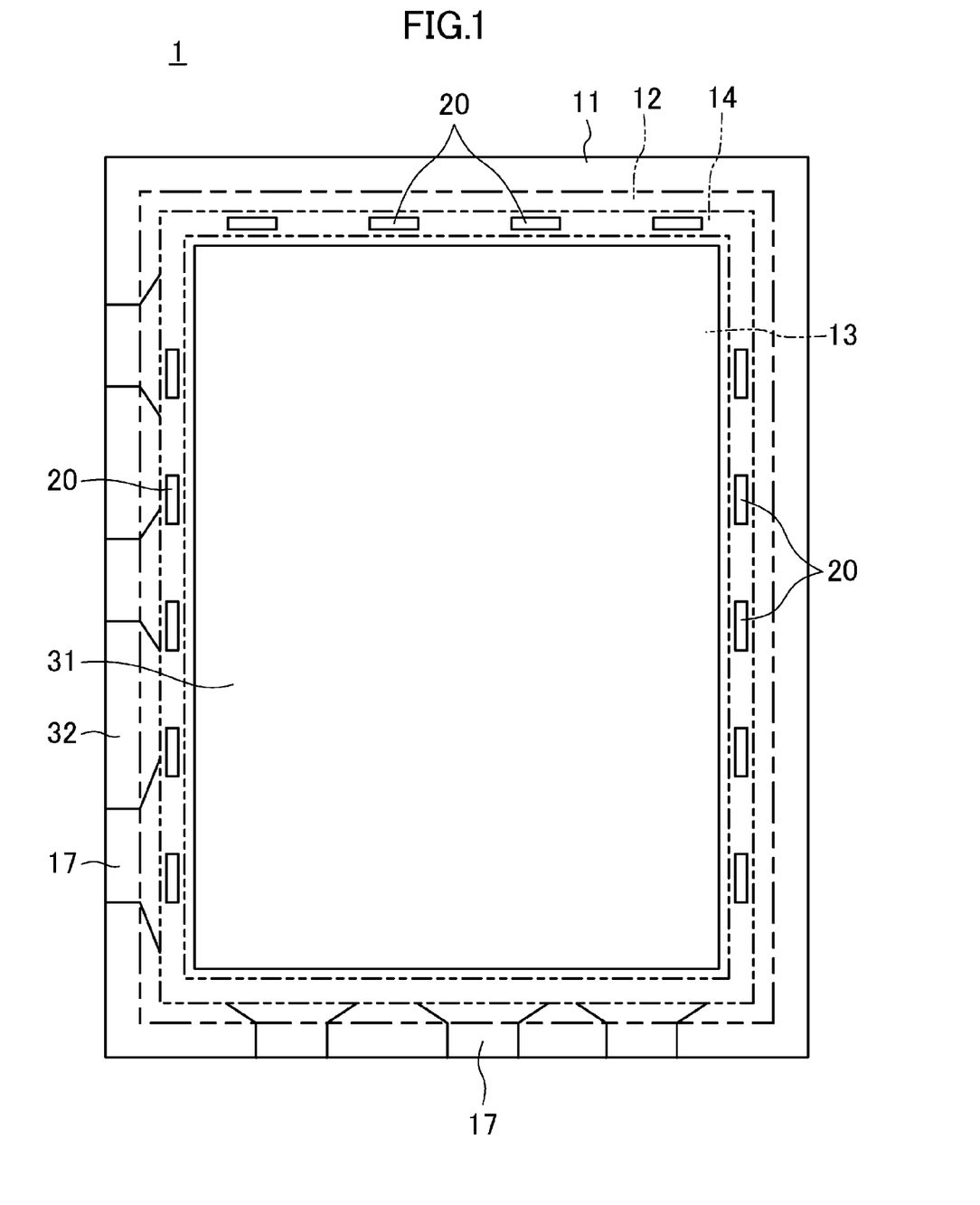
FIG. 1 is a plan view showing a schematic structure of a TFT substrate of a first embodiment.
Figure 2:
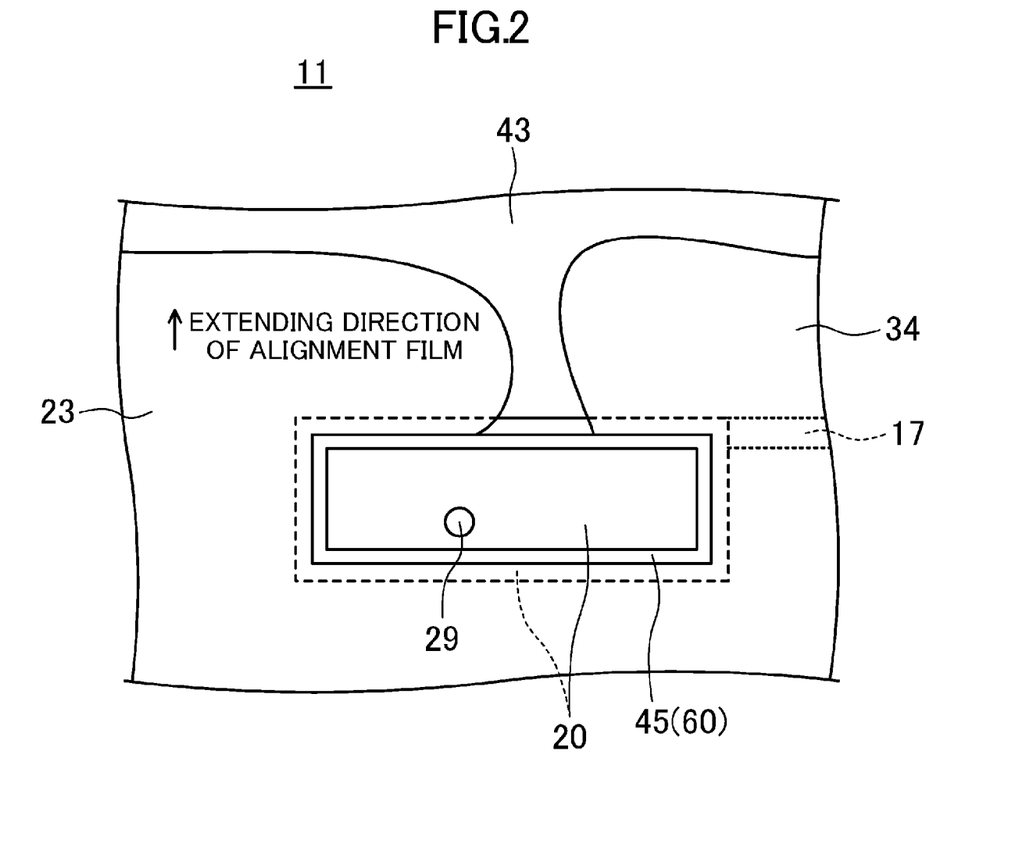
FIG. 2 is an enlarged plan view showing the vicinity of a pad on the TFT substrate of the first embodiment.
Figure 3:
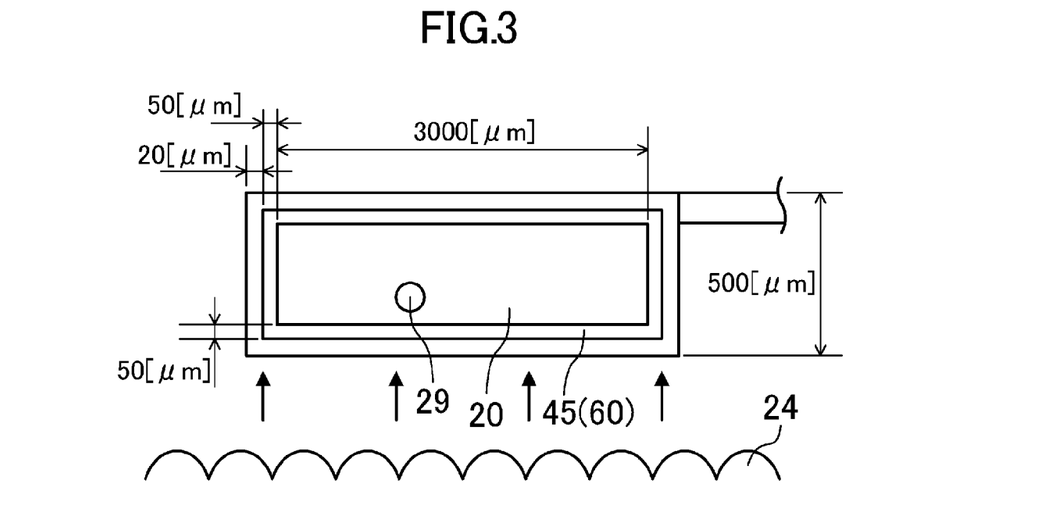
FIG. 3 is a plan view showing an alignment film material flowing toward the pad on the TFT substrate of the first embodiment.
Figure 4:
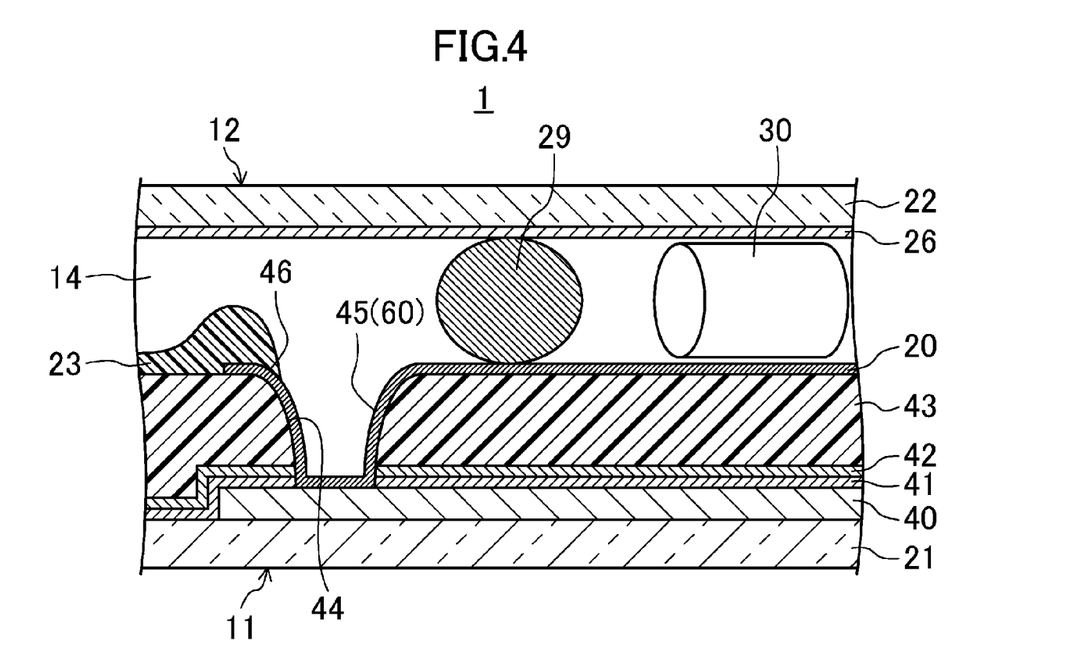
FIG. 4 is an enlarged cross-sectional view showing a cross-sectional structure of a liquid crystal display device of the first embodiment.

FIG. 1 is a plan view showing a schematic structure of a TFT substrate 11 of the first embodiment. FIG. 2 is an enlarged plan view showing the vicinity of a pad 20 on the TFT substrate 11 of the first embodiment. FIG. 3 is a plan view showing an alignment film material 24 flowing toward the pad 20 on the TFT substrate 11 of the first embodiment. FIG. 4 is an enlarged cross-sectional view showing a cross-sectional structure of a liquid crystal display device 1 of the first embodiment.

The liquid crystal display device 1 includes, as shown in FIGS. 1 and 4, a TFT substrate 11 as a first substrate, a counter substrate 12 as a second substrate facing the TFT substrate 11, and a liquid crystal layer 13 provided between the TFT substrate 11 and the counter substrate 12.

The liquid crystal display device 1 further includes a sealing member 14 provided between the TFT substrate 11 and the counter substrate 12 to surround and seal the liquid crystal layer 13. The sealing member 14 is substantially in the form of a rectangular frame as shown in FIG. 1, and is made of a UV/thermally curable resin, such as an epoxy-based resin, in which a plurality of conductive particles 29 as a conductive material and glass fibers 30 are dispersed and mixed. An outer diameter of the conductive particle 29 is about 5 μm, and a diameter of the glass fiber 30 is about 4 μm. A line width of the sealing member 14 is about 0.5 mm, for example.

In FIGS. 2 and 3, only a single conductive particle 29 is shown, and the other conductive agents are not shown for easy description.

Each of the TFT substrate 11 and the counter substrate 12 has a pixel region 31 as a display region, and a frame region 32 as a non-display region surrounding the pixel region 31. The frame region 32 includes a sealing member region 34 (a region for forming the sealing member 14) provided with a predetermined distance from the pixel region 31.

Alignment films 23, each extending from the pixel region 31 to the sealing member region 14, are formed on a surface of the TFT substrate 11 facing the liquid crystal layer 13 and a surface of the counter substrate 12 facing the liquid crystal layer 13, respectively, by curing an alignment film material 24 having fluidity.

The alignment film 23 is made of a resin material such as polyimide, and controls initial orientation of liquid crystal molecules in the liquid crystal layer 13. The alignment film material 24 has a viscosity reduced by adding a solvent to polyimide etc. The alignment film material 24 may be, for example, a vertical alignment film material having a viscosity of 6.5 mPa·s manufactured by JSR Corporation.

(Counter Substrate)

The counter substrate 12 has a glass substrate 22 as a support substrate as shown in FIG. 4. A common electrode 26 as an electrode portion which is made of a transparent conductive film, such as an ITO film, and has a thickness of about 100 nm is formed on a surface of the glass substrate 22 facing the TFT substrate 11. The common electrode 26 has a thickness of about 100 nm.

(TFT Substrate)

A plurality of pixels (not shown) are arranged in a matrix pattern in the pixel region 31 of the TFT substrate 11. A pixel electrode (not shown) made of a transparent conductive film, such as an indium tin oxide (ITO) film, is formed in each of the pixels. A thin-film transistor (TFT, not shown) as a switching element connected to the pixel electrode is formed in each of the pixels. Gate lines (not shown) and source lines (not shown) connected to the TFTs are formed on the TFT substrate 11.

The TFT substrate 11 has a glass substrate 21 as a support substrate as shown in FIG. 4. A plurality of gate lines and lower electrodes 40 are formed on a surface of the glass substrate 21 facing the counter substrate 12. The lower electrodes 40 are arranged at predetermined intervals in the sealing member region 34, and are made of the same material as the gate lines. Specifically, the lower electrode 40 is made of a 100 nm thick Ti film, a 300 nm thick Al film stacked on the Ti film, and a 50 nm thick Ti film stacked on the Al film.

As shown in FIG. 1, a plurality of lead lines 17 made of the same material as the gate lines are formed in the frame region 32 on the glass substrate 21. Some of the lead lines 17 are connected to the lower electrodes 40. A line width of the lead line 17 is about 10 μm.

A gate insulating film 41 is formed on the surface of the glass substrate 21 to cover the gate lines and the lower electrodes 40 as shown in FIG. 4. The gate insulating film 41 is made of an oxide film, such as a $SiO_2$ film, and has a thickness of about 0.4 μm.

A passivation film 42 as a protective film is formed on a surface of the gate insulating film 41. The passivation film 42 is made of an inorganic film, such as a SiN film, and has a thickness of about 0.25 μm.

An interlayer insulating film 43 is formed on a surface of the passivation film 42 to cover the lower electrodes 40, etc. The interlayer insulating film 43 is made of a photosetting acrylic resin, for example, and has a thickness of about 2.5 μm.

A plurality of pads 20 made of a transparent conductive film, such as an ITO film, are formed as an electrode portion on a surface of the interlayer insulating film 43 in the sealing member region 34 on the TFT substrate 11. The pads 20 have a thickness of about 100 nm, and are arranged at predetermined intervals on the sealing member 14 as shown in FIG. 1. The pads 20 are electrically connected to the common electrode 26 on the counter substrate 12 through the conductive particles 29 in the sealing member 14. The pads 20 are arranged to face the lower electrodes 40, respectively.

An opening 44 in the form of a slit is formed in the interlayer insulating film 43, the passivation film 42, and the gate insulating film 41 to expose the lower electrode 40. Thus, each of the pads 20 is formed on the surface of the interlayer insulating film 43 and an inner surface of the opening 44.

Specifically, a recessed part of the pad 20 forms a recessed groove 45 in the opening 44. Thus, each of the pads 20 is electrically connected to the lower electrode 40 facing the pad 20 through the opening 44.

Thus, a control structure 60 made of the recessed groove 45 is formed in the TFT substrate 11 of the first embodiment. The control structure 60 is arranged at least between the pad 20 and the pixel region 31, and controls the flow of the alignment film material 24 before curing so that at least part of the pad 20 is exposed from the alignment film 23. The control structure 60 of the present embodiment is made of a rectangular ring-shaped recessed groove 45 which covers at least part of the pad 20. Thus, part of the pad 20 surrounded by the rectangular ring-shaped recessed groove 45 is exposed from the alignment film 23.

The recessed groove 45 has an inclined part 46 constituting an inner wall surface of the recessed groove 45, and part of the inclined part 46 is covered with the alignment film 23. Specifically, the inclined part 46 has a round convex surface forming a rim of the recessed groove 45, and supports an edge of the alignment film 23. The alignment film 23 is not formed inside the recessed groove 45, and a bottom surface of the recessed groove 45 is exposed from the alignment film 23.

As shown in FIG. 3, the pad 20 has a short side of about 500 μm, and a long side of about 3140 μm. A line width of the recessed groove 45 is about 50 μm, and a distance between an outer edge of the recessed groove 45 and an outer edge of the pad 20 is about 20 μm. Thus, part of the pad 20 having a short side of about 360 μm and a long side of about 3000 μm inside the recessed groove 45 is exposed from the alignment film 23.

The sealing member 14 is formed on the surface of the interlayer insulating film 43 in the sealing member region 34 to cover the pad 20 and the recessed groove 45. The conductive particles 29 in the sealing member 14 are sandwiched between the pad 20 exposed from the alignment film 23 and the common electrode 26 of the counter substrate 12, thereby electrically connecting the pad 20 and the common electrode 26.

—Fabrication Method—

A method for fabricating the liquid crystal display device 1 will be described below.

The liquid crystal display device 1 is fabricated by forming the frame-shaped sealing member 14 on the TFT substrate 11 or the counter substrate 12, dropping liquid crystal inside the sealing member 14, and bonding the TFT substrate 11 and the counter substrate 12.

In fabricating the TFT substrate 11, lower electrodes 40 are formed simultaneously with gate lines (not shown) on a surface of a glass substrate 21 which is a transparent substrate. Then, a gate insulating film 41, a silicon film (i layer, n+ phase, not shown), source lines (not shown), and a passivation film 42 are formed to cover the lower electrodes and the gate lines. Then, an interlayer insulating film 43 is formed to cover the TFTs etc.

The interlayer insulating film 43 can be made of a photosensitive organic material such as a photosetting acrylic region, or a non-photosensitive insulating film. When the photosensitive organic material is used, the organic material is applied to the glass substrate 21 to form a flat surface by spin coating (slit coating, or ink jet printing may be available).

Then, a slit-shaped opening 44 penetrating the interlayer insulating film 43, the passivation film 42, and the gate insulating film 41 is formed by photolithography and etching. The lower electrode 40 is exposed inside the opening 44.

When the non-photosensitive insulating film is used to form the interlayer insulating film 43, an insulating material layer of a uniform thickness is formed on the glass substrate 21 by, for example, CVD (sputtering, or applying an applicable material may be available), and a photosensitive resist is applied to the entire surface of the insulating material layer. Then, a predetermined resist pattern is formed by photolithography. Then, the insulating material layer is etched (by wet or dry etching), and the resist pattern is removed, thereby forming the opening 44.

Then, an ITO layer is formed on a surface of the interlayer insulating film 43, and is patterned by photolithography and etching to simultaneously form a plurality of pads 20 and pixel electrodes (not shown). Thus, a recessed groove 45 as a control structure 60 is formed inside the opening 44 by a recessed part of the pad 20.

Then, an alignment film material 24 having fluidity, such as polyimide, is supplied by ink jet printing to cover the plurality of pads 20 and the pixel electrodes. The alignment film material 24 flows from the pixel region 31 to the frame region 32 as shown in FIG. 3. When the alignment film material 24 reaches an inclined part 46 of the recessed groove 45, an edge of the alignment film material 24 is supported by the inclined part 46.

As a result, the alignment film material 24 bulges toward the counter substrate 12 near the inclined part 46 of the recessed groove 45 as shown in FIG. 4, thereby stopping the flow of the alignment film material. Thus, the flow of the alignment film material 24 is controlled by the recessed groove 45, and bypasses a region surrounded by the recessed groove 45. Then, the alignment film material 24 is baked to form an alignment film 23. Thus, the TFT substrate 11 is fabricated.

—Advantages of First Embodiment—

According to the first embodiment, the recessed groove 45 as the control structure 60 is formed between the pad 20 and the pixel region 31. Thus, the flow of the alignment film material 24 from the pixel region 31 to the sealing member region 34 can be controlled by the recessed groove 45, and part of the pads 20 is not covered, and can be exposed from the alignment film 23. Thus, the part of the pad 20 can directly be connected to the conductive particles 29 in the sealing member 14 without the alignment film 23 interposed therebetween.

Thus, according to the first embodiment, the pad 20 on the TFT substrate 11 and the common electrode 26 on the counter substrate 12 can electrically be connected through the conductive particles 29 even when the groove for holding the alignment film material 24 is not formed between the pixel region 31 and the sealing member region 34. Thus, the frame region 32 can be greatly narrowed, and the electrical connection between the TFT substrate 11 and the counter substrate 12 can be ensured.

Since the recessed groove 45 surrounding at least part of the pad 20 is formed as the control structure 60, the surrounded part of the pad 20 can surely be exposed from the alignment film 23.

In addition, since the control structure 60 also serves as a connector between the pad 20 and the lower electrode 40, there is no need to increase the non-display region only for the purpose of providing the control structure 60. This can further narrow the frame region 32.

[Second Embodiment of the Invention]

Figure 5:
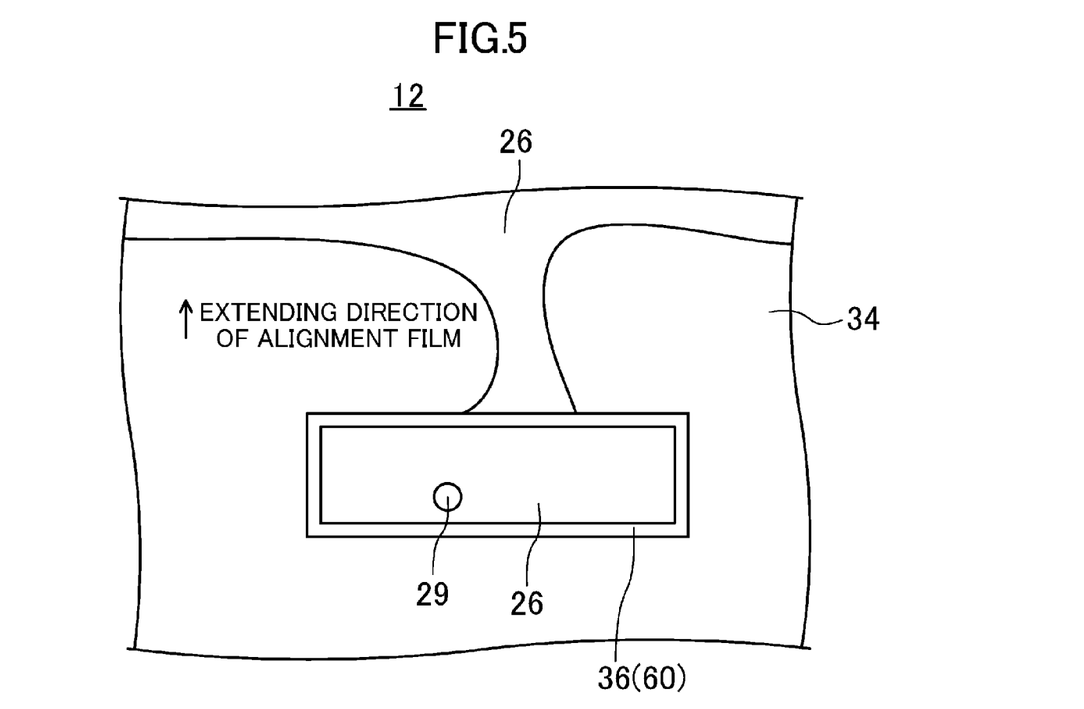
FIG. 5 is an enlarged plan view showing a region on a counter substrate of a second embodiment facing a pad.
Figure 6:
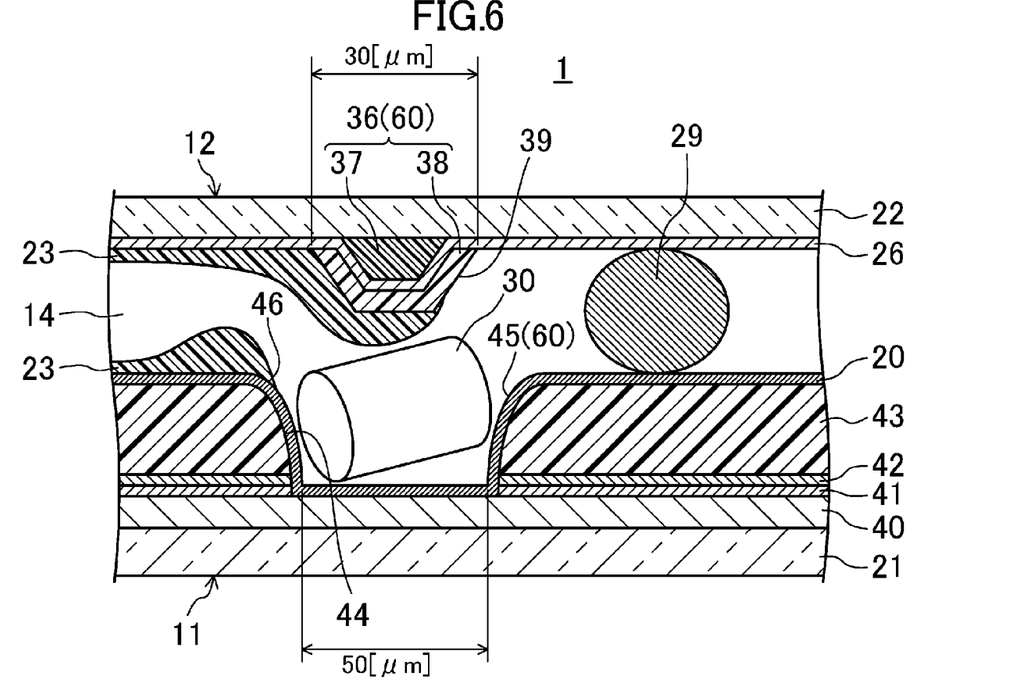
FIG. 6 is an enlarged cross-sectional view showing a cross-sectional structure of a liquid crystal display device of the second embodiment.

FIGS. 5 and 6 show a second embodiment of the present invention.

FIG. 5 is an enlarged plan view showing a region on a counter substrate 12 of a second embodiment facing a pad 20. FIG. 6 is an enlarged cross-sectional view showing a cross-sectional structure of a liquid crystal display device 1 of the second embodiment. In the following embodiments, the same components as those shown in FIGS. 1-4 will be indicated by the same reference characters to omit detailed description thereof.

In the first embodiment, the control structure 60 is formed in the TFT substrate 11. In the second embodiment, the control structure 60 is formed in both of the TFT substrate 11 and the counter substrate 12.

(TFT Substrate)

The TFT substrate 11 has the same structure as that of the first embodiment. A width of the recessed groove 45 is about 50 μm so that a glass fiber 30 in the sealing member 14 can be contained in the recessed groove 45 as shown in FIG. 6.

(Counter Substrate)

The counter substrate 12 has a glass substrate 22 as a support substrate as shown in FIG. 6. A common electrode 26 made of a transparent conductive film, such as an ITO film, having a thickness of about 100 nm is formed on a surface of the glass substrate 22 facing the TFT substrate 11. A plurality of color layers (not shown) constituting a color filter (not shown) and a black matrix (not shown) as a light shield film are formed on the surface of the glass substrate 22, and the common electrode 26 is formed on a surface of the color filter. The color layers are filters each transmitting red (R), green (G), or blue (B) light, and are arranged in a matrix pattern in the pixel region 31 on the counter substrate 12. The black matrix blocks light transmission through a region between the adjacent color layers, and blocks light transmission through the frame region 32. The sealing member 14 is the same as that formed on the TFT substrate 11, and is arranged in the sealing member region 34 in the frame region 32.

An alignment film 23 extending from the pixel region 31 to the sealing member region 34 is formed on a surface of the counter substrate 12 facing the liquid crystal layer 13 by curing the same alignment film material 24 as that provided on the TFT substrate 11.

A ridge portion 36 as the control structure 60 is formed on the surface of the glass substrate 22 to protrude toward the TFT substrate 11 and extend in the form of a rib. As shown in FIGS. 2, 5, and 6, the ridge portion 36 is located inside the recessed groove 45 when viewed in a direction normal to the surface of the TFT substrate 11 or the counter substrate 12. Specifically, the ridge portion 36 is in the form of a rectangular ring covering part of the common electrode 26 as shown in FIG. 5. Thus, part of the common electrode 26 surrounded by the rectangular ring-shaped ridge portion 36 is exposed from the alignment film 23.

The ridge portion 36 includes a base 37 made of the same material as the blue color layer, for example, and a coating 38 which covers the base 37. The coating 38 is made of a photosensitive acrylic resin, which is the same material as a rib (not shown) or a photospacer (not shown) formed on the counter substrate 12 to align the liquid crystal molecules in vertical orientation.

The ridge portion 36 includes inclined parts 39 constituting outer wall surfaces of the ridge portion 36, and part of the inclined parts 39 is covered with the alignment film 23. The ridge portion 36 is substantially tapered in a direction from the counter substrate 12 to the TFT substrate 11 as viewed in cross section of FIG. 6. An outer one (a left one in FIG. 6) of the inclined parts 39 of the ring-shaped ridge portion 36 is covered with the alignment film 23, while an inner one (a right one in FIG. 6) of the inclined parts 39 is exposed from the alignment film 23. Specifically, the inner inclined part 39 supports an edge of the alignment film 23.

As shown in FIG. 6, the base 37 has a thickness of about 2.5 μm, and a width of about 30 μm. The coating 38 on the base 37 has a thickness of about 4 μm, and a width of about 30 μm.

A sealing member 14 is formed on a surface of the common electrode 26 in the sealing member region 34 to cover the ridge portion 36. Thus, conductive particles 29 in the sealing member 14 are sandwiched between the common electrode 26 exposed from the alignment film 23 and the pad 20 on the TFT substrate 11, thereby electrically connecting the pad 20 and the common electrode 26.

—Fabrication Method—

A method for fabricating the liquid crystal display device 1 will be described below.

The TFT substrate 11 is fabricated in the same manner as the first embodiment. In fabricating the counter substrate 12, a color filter (not shown) is formed on a surface of a glass substrate 22 which is a transparent substrate. In forming color layers (not shown) of the color filter, a base 37 is simultaneously formed on a surface of the glass substrate 22 in a sealing member region 34 with the same material as the color layers.

Then, a common electrode 26 is formed to cover the base 37 and the color filter, and a photosensitive acrylic resin, for example, is deposited on a surface of the common electrode 26. Then, a coating 38 covering the base 37, and a photospacer (not shown) or a rib for aligning the liquid crystal molecules in vertical orientation are simultaneously formed by photolithography.

Then, an alignment film material 24 having fluidity, such as polyimide, is supplied by ink jet printing to cover the color filter etc.

The alignment film material 24 flows from the pixel region 31 to the frame region 32. When the alignment film material 24 reaches the ridge portion 36, an edge of the alignment film material 24 is supported by the inner inclined part 39 of the ridge portion 36. As a result, the alignment film material 24 bulges toward the TFT substrate 11 on the ridge portion 36 as shown in FIG. 6, thereby stopping the flow of the alignment film material. The alignment film material 24 is then baked to form an alignment film 23. Thus, the counter substrate 12 is fabricated.

—Advantages of Second Embodiment—

According to the second embodiment, the recessed groove 45 as the control structure 60 is formed in the TFT substrate 11 to expose the pad 20 from the alignment film 23. Thus, the same advantages as those of the first embodiment can be obtained. In addition, the ridge portion 36 as the control structure 60 is formed on the counter substrate 12 to expose part of the common electrode 26 facing the pad 20. Thus, the common electrode 26 and the conductive particle 29 are surly brought into contact, thereby electrically connecting the counter substrate 12 and the TFT substrate 11 with reliability.

Since the control structure 60 is made of the ring-shaped ridge portion 36 surrounding the part of the common electrode 26, the part of the common electrode 26 can surely be exposed from the alignment film 23.

The ridge portion 36 is located inside the recessed groove 45 in the TFT substrate 11 when viewed in a direction normal to the surface of the substrate. Thus, the flow of the alignment film material 24 on the TFT substrate 11 toward the inside of the recessed groove 45 can surely be prevented. Further, even when the sealing member 14 contains the glass fibers 30, the glass fiber 30 can be contained in the recessed groove 45 as shown in FIG. 6. This can reduce the possibility that cell thickness (thickness of the liquid crystal layer 13) becomes uneven due to the glass fiber 30 sandwiched between the TFT substrate 11 and the counter substrate 12.

[Other Embodiments]

Figure 7:
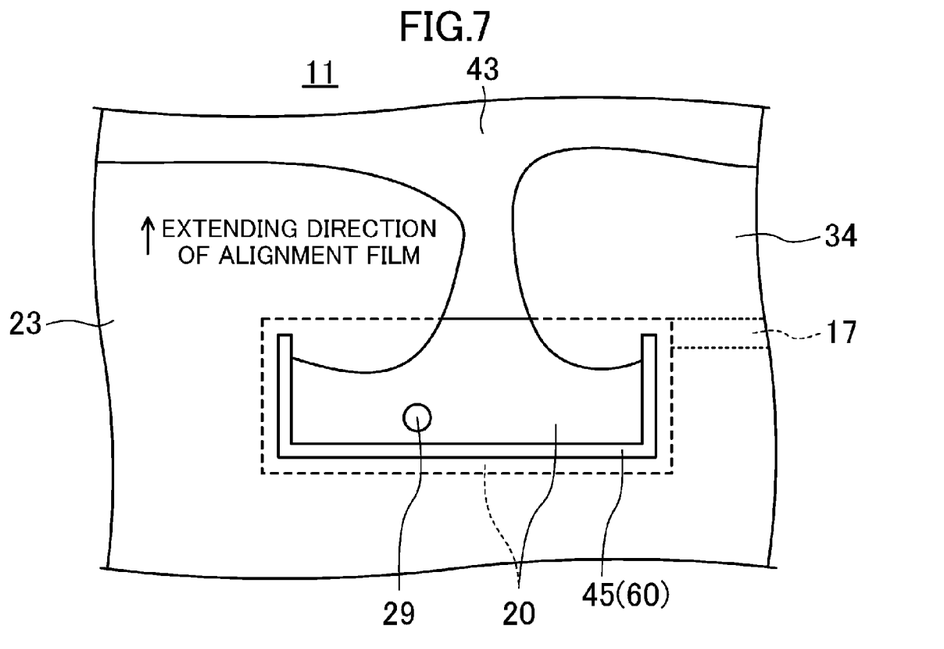
FIG. 7 is a plan view corresponding to FIG. 2, showing the vicinity of a pad on a TFT substrate of another embodiment.

In the first and second embodiments, the recessed groove 45 and the ridge portion 36 as the control structure 60 are in the form of a continuous ring. However, the present invention is not limited to the form, and the control structure 60 (the recessed groove 45 and the ridge portion 36) may be in the form of U when viewed in a direction normal to the surface of the TFT substrate 11 or the counter substrate 12, with their arms extending in a direction opposite the pixel region 31 (i.e., upward in FIG. 7) as shown in FIG. 7 corresponding to FIG. 2.

Figure 8:
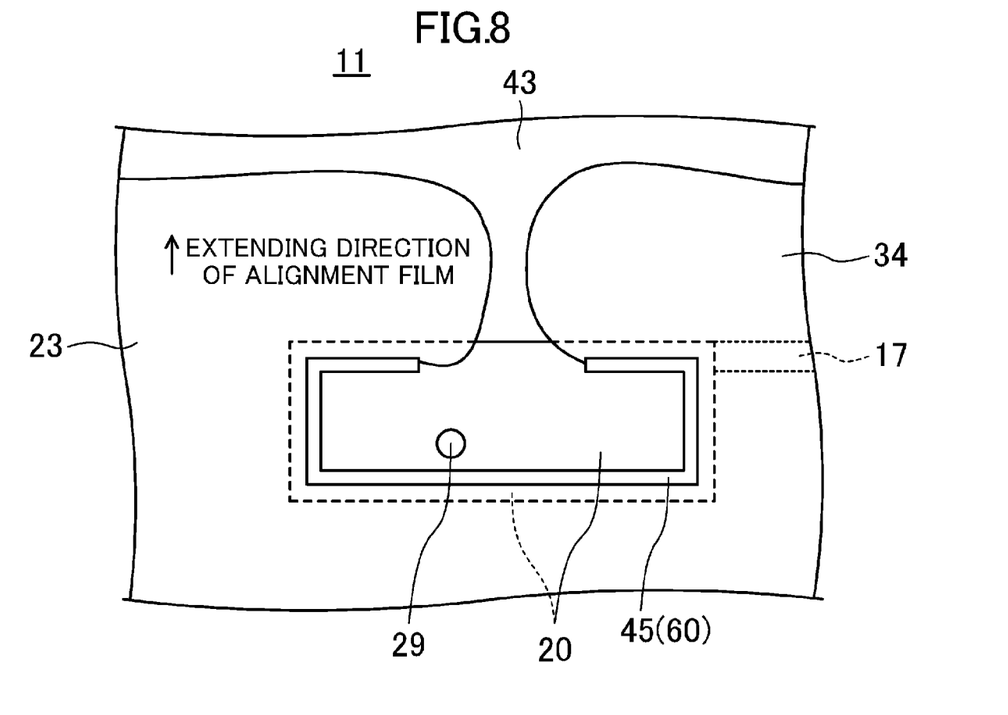
FIG. 8 is a plan view corresponding to FIG. 2, showing the vicinity of a pad of a TFT substrate of still another embodiment.

As shown in FIG. 8 corresponding to FIG. 2, the control structure 60 (the recessed groove 45 and the ridge portion 36) may be in the form of a ring which is chipped at part thereof opposite the pixel region 31 when viewed in a direction normal to the surface of the TFT substrate 11 or the counter substrate 12. This configuration can also provide the advantages similar to those of the first embodiment.

In the embodiments described above, the recessed groove 45 or the ridge portion 36 in the form of a single ring is formed as the control structure 60. However, the present invention is not limited thereto, and the recessed groove 45 or the ridge portion 36 may be formed in the form of double or triple rings coaxial with each other.

The control structure 60 may be formed on at least one of the TFT substrate 11 or the counter substrate 12. However, for reliable electrical connection between the TFT substrate 11 and the counter substrate 12, the control structure 60 is preferably provided on each of the substrates 11, 12.

In the first and second embodiments, the TFT substrate 11 and the counter substrate 12 are electrically conducted through the conductive particles 29 in the sealing member 14. However, the present invention is not limited thereto. For example, the TFT substrate 11 and the counter substrate 12 may electrically be conducted through a different conductive material, such as conductive paste.

Industrial Applicability

As described above, the present invention is useful for the liquid crystal display devices.

Description of Reference Characters

1 Liquid crystal display device
11 TFT substrate (first substrate)
12 Counter substrate (second substrate)
13 Liquid crystal layer
14 Sealing member
20 ad (electrode portion)
23 Alignment film
24 Alignment film material
26 Common electrode (electrode portion)
29 Conductive particle (conductive material)
31 Pixel region
32 Frame region
34 Sealing member region
36 Ridge portion (control structure)
37 Base
38 Coating
39, 46 Inclined part
40 Lower electrode
43 Interlayer insulating film
44 Opening
45 Recessed groove (control structure)
60 Control structure

The invention claimed is:

1. A liquid crystal display device comprising:
a first substrate;
a second substrate facing the first substrate;
a liquid crystal layer provided between the first substrate and the second substrate; and
a sealing member provided between the first substrate and the second substrate to surround and seal the liquid crystal layer, wherein
each of the first substrate and the second substrate includes a pixel region as a display region, and a frame region as a non-display region which surrounds the pixel region and includes a sealing member region for forming the sealing member, alignment films, each extending from the pixel region to the sealing member region, are formed on a surface of the first substrate facing the liquid crystal layer and a surface of the second substrate facing the liquid crystal layer, respectively, by curing an alignment film material having fluidity, electrode portions are formed in the sealing member regions of the first substrate and the second substrate, respectively, so that the electrode portions are electrically connected to each other through a conductive material, a control structure is formed at least between the electrode portion and the pixel region on at least one of the first substrate or the second substrate to control a flow of the alignment film material before curing so that at least part of the electrode portion is exposed from the alignment film, and the control structure is in the form of a ring which is chipped at part thereof opposite the pixel region when viewed in a direction normal to a surface of the first substrate or the second substrate.

2. The liquid crystal display device of claim 1, wherein the control structure is surrounding the at least part of the electrode portion.

3. The liquid crystal display device of claim 1, wherein the control structure is in the form of U when viewed in a direction normal to a surface of the first substrate or the second substrate, and arms of the control structure extend in a direction opposite the pixel region.

4. The liquid crystal display device of claim 1, wherein the first substrate is provided with a lower electrode, an interlayer insulating film covering the lower electrode, and a slit-shaped opening penetrating the interlayer insulating film to expose the lower electrode, the electrode portion of the first substrate is formed on a surface of the interlayer insulating film, and is connected to the lower electrode through the opening, and a recessed groove formed inside the opening in the first substrate constitutes the control structure.

5. The liquid crystal display device of claim 4, wherein the recessed groove includes an inclined part constituting an inner wall surface of the recessed groove, and part of the inclined part of the recessed groove is covered with the alignment film.

6. The liquid crystal display device of claim 4, wherein a ridge portion formed on the second substrate to protrude toward the first substrate constitutes the control structure, and the ridge portion is located in the recessed groove when viewed in a direction normal to a surface of the first substrate or the second substrate.

7. The liquid crystal display device of claim 1, wherein a ridge portion formed on the second substrate to protrude toward the first substrate constitutes the control structure.

8. The liquid crystal display device of claim 7, wherein the ridge portion includes an inclined part constituting an outer wall surface of the ridge portion, and at least part of the inclined part of the ridge portion is covered with the alignment film.

9. A liquid crystal display device comprising:
a first substrate;
a second substrate facing the first substrate;
a liquid crystal layer provided between the first substrate and the second substrate; and
a sealing member provided between the first substrate and the second substrate to surround and seal the liquid crystal layer, wherein each of the first substrate and the second substrate includes a pixel region as a display region, and a frame region as a non-display region which surrounds the pixel region and includes a sealing member region for forming the sealing member, alignment films, each extending from the pixel region to the sealing member region, are formed on a surface of the first substrate facing the liquid crystal layer and a surface of the second substrate facing the liquid crystal layer, respectively, by curing an alignment film material having fluidity, electrode portions are formed in the sealing member regions of the first substrate and the second substrate, respectively, so that the electrode portions are electrically connected to each other through a conductive material, a control structure is formed at least between the electrode portion and the pixel region on at least one of the first substrate or the second substrate to control a flow of the alignment film material before curing so that at least part of the electrode portion is exposed from the alignment film, the first substrate is provided with a lower electrode, an interlayer insulating film covering the lower electrode, and a slit-shaped opening penetrating the interlayer insulating film to expose the lower electrode, the electrode portion of the first substrate is formed on a surface of the interlayer insulating film, and is connected to the lower electrode through the opening, an a recessed groove formed inside the opening in the first substrate constitutes the control structure, the recessed groove includes an inclined part constituting an inner wall surface of the recessed groove, and part of the inclined part of the recessed groove is covered with the alignment film.

10. The liquid crystal display device of claim 9, wherein the control structure is in the form of a ring surrounding the at least part of the electrode portion.

11. The liquid crystal display device of claim 9, wherein the control structure is in the form of U when viewed in a direction normal to a surface of the first substrate or the second substrate, and arms of the control structure extend in a direction opposite the pixel region.

12. The liquid crystal display device of claim 9, wherein the control structure is in the form of a ring which is chipped at part thereof opposite the pixel region when viewed in a direction normal to a surface of the first substrate or the second substrate.

13. The liquid crystal display device of claim 9, wherein a ridge portion formed on the second substrate to protrude toward the first substrate constitutes the control structure.

14. The liquid crystal display device of claim 13, wherein the ridge portion includes an inclined part constituting an outer wall surface of the ridge portion, and at least part of the inclined part of the ridge portion is covered with the alignment film.

15. The liquid crystal display device of claim 9, wherein a ridge portion formed on the second substrate to protrude toward the first substrate constitutes the control structure, and the ridge portion is located in the recessed groove when viewed in a direction normal to a surface of the first substrate or the second substrate.

16. A liquid crystal display device comprising:
a first substrate;
a second substrate facing the first substrate;
a liquid crystal layer provided between the first substrate and the second substrate; and
a sealing member provided between the first substrate and the second substrate to surround and seal the liquid crystal layer, wherein
each of the first substrate and the second substrate includes a pixel region as a display region, and a frame region as a non-display region which surrounds the pixel region and includes a sealing member region for forming the sealing member,
alignment films, each extending from the pixel region to the sealing member region, are formed on a surface of the first substrate facing the liquid crystal layer and a surface of the second substrate facing the liquid crystal layer, respectively, by curing an alignment film material having fluidity,
electrode portions are formed in the sealing member regions of the first substrate and the second substrate, respectively, so that the electrode portions are electrically connected to each other through a conductive material,
a control structure is formed at least between the electrode portion and the pixel region on at least one of the first substrate or the second substrate to control a flow of the alignment film material before curing so that at least part of the electrode portion is exposed from the alignment film,
a ridge portion formed on the second substrate to protrude toward the first substrate constitutes the control structure,
the ridge portion includes an inclined part constituting an outer wall surface of the ridge portion, and
at least part of the inclined part of the ridge portion is covered with the alignment film.

* * * * *